(12) United States Patent
Robert et al.

(10) Patent No.: US 11,737,432 B2
(45) Date of Patent: Aug. 29, 2023

(54) UNIT FOR SORTING MOVING PARTS

(71) Applicant: Egg-Chick Automated Technologies, Landivisiau (FR)

(72) Inventors: Pierre Robert, Cholet (FR); Laurent Queveau, Murs-Erigne (FR)

(73) Assignee: Egg-Chick Automated Technologies, Landivisiau (FR)

( * ) Notice: Subject to any disclaimer, the term of this patent is extended or adjusted under 35 U.S.C. 154(b) by 282 days.

(21) Appl. No.: 17/291,131

(22) PCT Filed: Nov. 4, 2019

(86) PCT No.: PCT/FR2019/052604
§ 371 (c)(1),
(2) Date: May 4, 2021

(87) PCT Pub. No.: WO2020/094958
PCT Pub. Date: May 14, 2020

(65) Prior Publication Data
US 2021/0386037 A1 Dec. 16, 2021

(30) Foreign Application Priority Data
Nov. 5, 2018 (FR) .................................... 1860158

(51) Int. Cl.
*B25J 15/06* (2006.01)
*B65G 43/10* (2006.01)
(Continued)

(52) U.S. Cl.
CPC ........... *A01K 43/04* (2013.01); *B25J 15/0625* (2013.01); *B65G 29/02* (2013.01); *B65G 43/10* (2013.01);
(Continued)

(58) Field of Classification Search
CPC ..... A01K 43/04; B25J 15/0625; B65G 29/02; B65G 43/10; B65G 43/47–914; B65G 47/918; B65G 2201/0208
(Continued)

(56) References Cited

U.S. PATENT DOCUMENTS 3,929,234 A * 12/1975 Warren ................... B65B 23/08
53/247
6,149,375 A 11/2000 Hebrank et al.

FOREIGN PATENT DOCUMENTS

| EP | 3194309 A1 * | 7/2017 | ............. A01K 43/00 |
| EP | 3194309 A1 | 7/2017 | |
| WO | 0054579 A1 | 9/2000 | |

OTHER PUBLICATIONS

WO-0054579-A1, Depauw, Sep. 2000 (Year: 2000).*
International Search Report for corresponding PCT Application No. PCT/FR2019/052604 dated Mar. 19, 2020.

* cited by examiner

*Primary Examiner* — Gene O Crawford
*Assistant Examiner* — Lester III Rushin
(74) *Attorney, Agent, or Firm* — Wood, Phillips, Katz, Clark & Mortimer (57) ABSTRACT

Unit for sorting parts moving along a conveyor belt comprising a transfer device (3) which comprises a roller (31) which is rotatably movable above the belt and a plurality of gripping tools (32) at the periphery of the roller which are each capable of selectively removing a part from the belt when the tools are brought into a removal position, each tool comprising a suction cup (321) attached to a tubular support sleeve (322) which is capable of creating a connection between the suction cup and an internal chamber (312) of the roller, said connection being kept at a negative pressure relative to the surrounding air, all of the suction cups which (Continued)

are brought into the removal position being depressurized, each sleeve being mounted so as to be translatably movable along the axis thereof through a wall (311) of the roller, an actuator (34) being designed to selectively control, in the removal position, the movement of the sleeve so that the suction cup engages with the part to be removed.

10 Claims, 3 Drawing Sheets

(51) Int. Cl.
    *B65G 47/91*     (2006.01)
    *A01K 43/04*     (2006.01)
    *B65G 29/02*     (2006.01)

(52) U.S. Cl.
    CPC ......... *B65G 47/914* (2013.01); *B65G 47/918* (2013.01); *B65G 2201/0208* (2013.01)

(58) Field of Classification Search
    USPC .......................................................... 198/349
    See application file for complete search history.

UNIT FOR SORTING MOVING PARTS

BACKGROUND OF THE INVENTION

The invention relates to a unit for sorting moving parts on a conveyor belt, comprising a parts transfer device that is capable of extracting from said conveyor belt parts selectively identified as non-compliant, the parts transfer device comprising a roller that is capable of being mounted so as to be transversely rotatable above said conveyor belt, and a plurality of gripping tools which extend radially at the periphery of said roller and are capable of each selectively removing one part from said conveyor belt when they are brought into a removal position defined by a first angular position of said roller, and of releasing said removed part when they are brought into a release position defined by a second angular position of said roller, each gripping tool comprising a suction cup that is fixed on a tubular support sleeve which is mounted on said roller and leads into the inside of said roller, said tubular support sleeve defining an inner duct that is provided with a lateral opening capable of establishing communication between said suction cup and a main chamber arranged inside said roller that is kept under depression with respect to the ambient air.

A preferred application of the invention is in the poultry industry for processing poultry eggs. For example, within the context of an industrial unit for sorting eggs depending on the results of candling operations aiming to detect eggs that are not compliant for a subsequent intended use, it is known to place the eggs according to regular locations distributed in trays arranged in series on a conveyor belt which causes them to move through a candling examination station intended to detect the non-compliant eggs, and then to an egg extraction station in order to separate those detected as non-compliant.

A sorting unit as described in the preamble above, in the use thereof in processing poultry eggs, is well known to a person skilled in the art, in particular by the example given by the patent document EP3194309. The unit described in this document comprises an egg extraction station using a rotating drum-type egg transfer device that is arranged transversely above the conveyor belt. Said drum or roller bears suction cup gripping tools on the periphery thereof, which tools are driven by the rotation of the roller into a position referred to as the removal position, with respect to the conveyor belt, for gripping the eggs identified as not being compliant, and then into a position referred to as the egg release position, determined during the rotation of the roller, where the eggs removed by the suction cup gripping tools are released, for example into an egg-receiving tray. In order to achieve this, a pressure chamber, arranged inside the roller, is kept under depression with respect to the ambient air, and each suction cup is firmly mounted on a support fixed to the roller, provided with an inner duct that is capable of bringing the suction cup into communication with the chamber of the roller that is under depression, said duct being provided with a controlled valve for opening or closing said communication. Thus, when the communication is open, in the removal position of the tools, a depression is ensured in the suction cup, which comes into engagement on the egg by means of suction. Then, when the communication is closed, in the release position of the tools, the suction cup is no longer subject to the depression, which makes it possible to release the egg into the receiving tray.

A unit of this kind is particularly advantageous because it is perfectly compatible with processing of continuously moving parts in series, and therefore capable of withstanding high processing rates.

However, said unit known from the prior art is associated with some disadvantages. Indeed, the ability to ensure reliable and effective extraction, from the conveyor belt, of the eggs detected as being non-compliant, is based on appropriate positioning of the suction cups with respect to the level of the moving eggs when they are brought by the roller into the removal position in relation to the belt. Thus, during the rotation of the roller into the removal position, the suction cups must be positioned with respect to the level of the eggs, such that they come into flush contact with the moving eggs opposite the suction cups on the conveyor belt, in order to thus make it possible to come correctly into engagement, by means of suction, with the eggs to be extracted, when the suction cups in question are placed under depression by the command to open the corresponding valve. Indeed, if the contact with the egg is not carried out correctly in the removal position, at the moment when the suction cup is placed under a depression, the suction is not sufficient for removing the egg.

It has been found that the processed eggs are very often of different sizes. Consequently, the level of the moving eggs is not homogeneous throughout, which makes it difficult to manage the correct positioning of the suction cups with respect to the level of the eggs, in order for it to be possible to ensure the removal in an effective manner. This problem of a lack of homogeneity of the moving eggs can also be accentuated by a lack of flatness of the racks in which the eggs are received and which are carried along in series, on after another, on the conveyor belt. Thus, even with the best possible adjustment of the position of the rotating roller in a region more or less distant from the conveyor belt, the passage of the suction cups into the removal position does not ensure correct extraction of all the non-compliant eggs detected.

Furthermore, the use of an opening and closing valve for ensuring that each suction cup is selectively placed under depression during the passage thereof into the removal position, requires a relatively complex arrangement of parts.

Finally, as has been seen, the successful completion of the egg-extraction operation resides in the fac that the suction cups moved by the roller into the removal position come into flush contact with the moving eggs. In other words, upon each passage into the removal position during the rotation of the roller, all the suction cups are intended to come into contact with the eggs, including the suction cups which will definitely not be commanded to grasp an egg. This systematic contacting of the moving eggs with all the suction cups brought into the removal position may represent a not insignificant health risk.

BRIEF SUMMARY OF THE INVENTION

In this context, the aim of the present invention is that of proposing a sorting unit without at least one of the limitations set out above.

For this purpose, the unit of the invention, which furthermore meets the general definition given by the preamble above, is essentially characterized in that all the suction cups brought into the removal position are under depression, each tubular support sleeve being mounted so as to be movable in translation according to the axis thereof on said roller, an actuator being capable of selectively commanding, in said removal position, the movement of said tubular support sleeve in the direction of said conveyor belt such that said suction cup engages with said part to be removed.

Thus, of the suction cups, all placed under depression, which are brought into the removal position by the rotation of the roller, only those which actually have to grasp a moving part identified as non-compliant are brought into contact with said part, by virtue of the selective commanding, in translation, of the support sleeve thereof, making it possible to radially move the suction cup from a position close to the roller to a position remote therefrom, in the direction of the conveyor belt, in which position it is intended to come into contact with the part to be grasped.

In other words, in the unit of the prior art the suction cups are fixed and, when they are brought into the removal position during the rotation of the roller, they are no longer under depression but are all in contact with the eggs, the removal being achieved by selectively commanding only the suction cups that must actually grasp the eggs to be placed under depression. In contrast, in the unit of the invention the suction cups are movable and, when they are brought into the removal position during the rotation of the roller, they are not in contact with the eggs but in contrast are all under depression, the removal thus being achieved by selectively commanding only the suction cups that must actually grasp the eggs to come into contact with the eggs, by virtue of the radial movement capacity of the suction cups provided by the translationally movable support sleeve thereof. This results in a dual advantage, both in health terms, since the contacts with the eggs are dramatically reduced thereby, limited in practice to only the suction cups which must carry out the removal of an egg, and also in terms of simplification, the management of the pneumatic circuit for placing the suction cups under depression being made less complex.

Furthermore, by virtue of the capacity of the suction cups for radial displacement in the direction of the conveyor belt, under the effect of the movability of the support sleeve in translation with respect to the rotating roller, said arrangement offers the possibility of adjustment to parts of noticeably different dimensions.

Advantageously, said tubular support sleeve is formed of a hollow tube element extending on either side of the wall of said roller, via a guide ring passing through the wall, comprising a shank protruding from an outer face of said wall, which shank is mounted by a first end in a hole of said wall, said hollow tube element being connected by a sliding connection to said guide ring which allows for a relative translational movement between said hollow tube element and said guide ring.

Advantageously, the inner surface of said shank comprises two cylindrical support protrusions for supporting an outer surface of said hollow tube, said protrusions being arranged at the respective ends of said shank and interconnected by a set-back inner cylindrical surface which defines a secondary chamber, said cylindrical support protrusion arranged on the side of said first end of said shank being provided with a plurality of longitudinal grooves which are intended to bring said secondary chamber into communication with said main chamber of the roller.

Advantageously, said hollow tube element is movable between a position retracted inside the roller, under the effect of the depression prevailing in the main chamber arranged inside the roller, in which position said opening is in direct communication with said main chamber in order to transfer the depression to said suction cup, and a position deployed towards the conveyor belt under the action of said actuator, in which position said opening is in direct communication with said secondary chamber in order to transfer the depression to said suction cup.

Advantageously, said shank comprises, at the first end thereof, a flange by means of which it can bear on a peripheral edge of said hole, by way of a sealing joint.

Preferably, said actuator comprises a cylinder that is mounted inside said roller, which cylinder is capable of pushing said tubular support sleeve through said wall of said roller towards the outside of said roller.

Advantageously, said unit comprises a means that forms a cam and is arranged inside said roller and is fixed with respect to the rotation of said roller, said cam being profiled such that, during the rotation of said roller after reaching said removal position, said tubular support sleeve is capable of encountering the cam and following the cam trajectory so as to force the movement of said tubular support sleeve towards the outside of said roller until said opening is positioned in the open air, at least in part, in the release position.

Advantageously, the first and second angular positions, defining said removal and release positions, respectively, are offset with respect to one another by at least 180°.

Advantageously, said unit comprises a control module which is capable of providing rotational speed instructions to said roller so as to bring about the rotation of the suction cups in a manner having a speed and phase synchronized to the movement of the parts.

Preferably, said unit is suitable for the processing of poultry eggs, said transfer device being arranged downstream of a candling station intended for detecting the non-compliant eggs with a view to extracting them from said conveyor belt by means of said transfer device.

BRIEF DESCRIPTION OF THE DRAWINGS

Other features and advantages of the invention will become clear from the following description of a particular embodiment of the invention, given by way of non-limiting example and with reference to the accompanying drawings, in which:

FIGS. 2 to 6 are schematic cross sections of the transfer device of the unit of FIG. 1, at different stages of the rotation of the roller, bearing the suction gripping tools, between the removal position and the release position, of which:

DETAILED DESCRIPTION OF THE INVENTION

The following description corresponds to a particular embodiment of the invention, according to which the unit for processing moving parts is a unit for processing poultry eggs. Thus, with reference to FIG. 1, the eggs to be processed 1 are each arranged in a cell 11 of a transport tray 10, the cells of which are organized in a series of mutually parallel rows and columns. The various trays are arranged one after the other on a conveying line comprising a conveyor belt 2 which is moved according to the longitudinal axis thereof as far as an extraction station for extracting eggs identified as non-compliant, comprising a transfer device 3 which is capable of transferring said non-compliant eggs from the conveyor belt on which they are moving to a zone for collecting the extracted eggs, outside of the conveying line. The non-compliant eggs would have been identified as such in a candling station, for example a visiometry inspection station (not shown), arranged upstream (with respect to the direction of movement of the eggs) of the extraction station on the line of movement.

Figures 1, 2, 7:
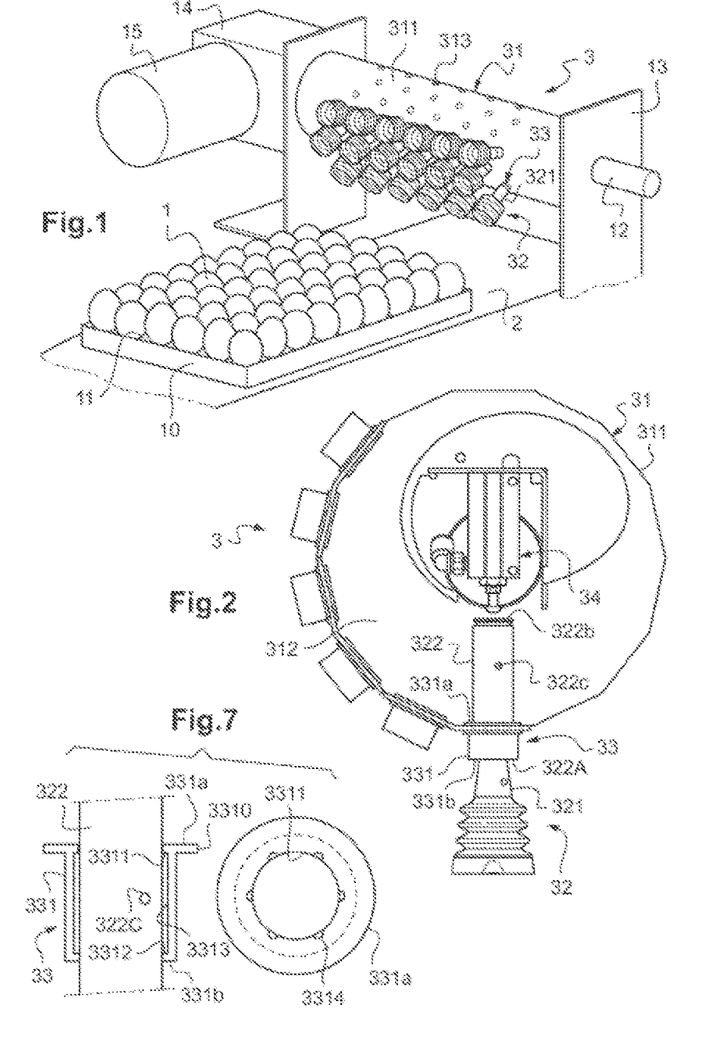
FIG. 1 is a schematic view of the part-sorting unit, revolving on a conveyor belt, according to the invention.
FIG. 2 is a schematic cross sections of the transfer device in an angular position of the roller that corresponds to the removal position for the suction cup shown with respect to the conveyor belt, the tubular support sleeve associated with the suction cup to be controlled being shown here in the retracted position.
FIG. 7 is a schematic longitudinal sectional view and plan view of the guide ring passing through the wall, in which ring the tubular support sleeve is mounted.

The transfer device 3 comprises a roller 31 that is rotatably mounted above the conveyor belt 2, having an axis transverse to the axis of movement of the conveyor belt 2. Thus, the eggs are moved in a manner passing below the roller 31. The end walls of the roller 31 are borne by bearings 12 which are intended for supporting the roller 31 and for ensuring its guidance in rotation between the two end supports 13. The position of the bearings 12 with respect to the supports makes it possible to adjust the position of the roller 31 with respect to the underlying conveyor belt 2. The connection between the roller and the bearings is achieved by a swivel joint which makes it possible to ensure a tight connection. The inner volume of the roller 31, delimited by the wall 311 thereof, defines an inner chamber 312, referred to as the main chamber, which is intended to be kept under depression with respect to the ambient air, under the effect of a vacuum pump (not shown). A pipe (not shown) makes it possible to connect the inside of the roller 31 and the vacuum pump. Swivel joints are provided around the pipe in the region of the passage thereof through the end wall of the roller, in order to ensure the tight sealing of the roller and the conservation of the low pressure prevailing therein.

The unit also comprises drive means 14 for causing the roller 30 to rotate, as well as a control module 15 intended for controlling the rotation of the roller in a manner synchronous with the movement of the eggs on the conveyor belt 2.

The roller 31 bears, on the periphery thereof, a plurality of gripping tools 32 which are arranged radially with respect to the axis thereof. The gripping tools 32 occupy the entire periphery of the roller. The gripping tools 32 are arranged on the wall 311 of the roller, in mutually parallel rows extending according to the longitudinal direction of the roller. Thus, when it is brought into the removal position by the rotation of the roller, each row of gripping tools is intended to come opposite a row of moving eggs under the roller, substantially vertically under the roller. The distribution of the gripping tools on the periphery of the roller, in particular the angular pitch between two rows of tools and the distance pitch between two tools of the same row, is adjusted depending on the geometry of the egg trays and the egg-receiving cells thereof.

It will be understood that it may advantageously be possible for the pitch between each row of gripping tools to be the same as the pitch between each row of cells of the tray, such that the speed of rotation of the roller and the speed of movement of the belt do not change during the gripping process for a tray. The speed of rotation of the roller will optionally be modified in order to adjust to the arrival of a new tray, and will become constant again if the pitch between each row of the new tray is the same as previously. However, if the pitch between each row of gripping tools is different from the pitch between each row of the tray, the control module is intended to make it possible for adjusting the speed of the roller between each gripping process to bring a row of gripping tools into the removal position under the roller, in a manner synchronous with the passage of a row of eggs under the roller.

According to a remaining distance to be traveled to the tray in order to reach the roller, the control module is capable of accelerating or slowing the rotation of the roller during an automatically calculated time, such that the first row of eggs is correctly aligned with respect to a row of gripping tools on the rover brought into the removal position.

Each gripping tool 32 is provided, at the distal end thereof, with a suction cup 321 which is intended to be brought into communication with the main chamber 312 of the roller 31 that is kept under depression. More precisely, each suction cup 321 is fixed on an end 322a of a tubular support sleeve 322, extending radially with respect to the axis of the roller 31, on either side of the wall 311 of the roller 31. In other words, the other end 322b of the tubular support sleeve 322 is located on the inside side of the roller, opposite the fixing end 322a of the suction cup 321 with respect to the wall 311 of the roller 31. According to the invention, the tubular support sleeve 322 of the suction cup 321 is mounted so as to be movable in translation according to the axis thereof through a hole 313 made in the wall 311 of the roller 31. The tubular support sleeve 322 of the suction cup 321 is formed by a hollow tube element, which is closed at the end 322b thereof opposite the fixing end 322a of the suction cup 321 and is open at said fixing end 322a, so as to define an inner duct for placing the suction cup 321 under depression by means of an opening 322c arranged on a lateral wall of the hollow tube element, making it possible to establish communication between the suction cup 34, mounted at the open fixing end 322a of the hollow tube element, and the main chamber 312 arranged inside the roller, kept under depression with respect to the ambient air.

The hollow tube element 322 preferably extends on either side of the wall 311 of the roller 31, via a guide ring passing through the wall 33, comprising a shank 331 which protrudes from an outer face of the wall 311 of the roller 31, over a particular predetermined length. The ring 33 is mounted by a first end 331a, referred to as a fixing end, in the hole 313 of the wall 311 of the roller 31, and the hollow tube element forming the tubular support sleeve 322 of the suction cup 321 is connected by a sliding connection to said guide ring 33, allowing for a relative translational movement between the hollow tube element and said guide ring.

The shank 331 of the guide ring 33 comprises, for example, a flange in the region of the fixing end 331a thereof, via which it is capable of bearing on an inner peripheral edge of the hole 313 of the wall 311 of the roller 31 in which it must be mounted. The mounting of the flange on the inner peripheral edge of the hole 313 is achieved by means of a sealing joint, in order to ensure the tight sealing of the roller and the conservation of the low pressure prevailing therein.

In the view in FIG. 2, the tubular support sleeve 322 of the suction cup 321 is shown in the retracted position inside the roller 31, on account of the depression prevailing in the main chamber 312 arranged inside the roper 31. In this retracted position, the tubular support sleeve 322 is displaced under the effect of the depression which is prevailing in the roller, such that the end 322b thereof, opposite the end 322a for fixing the suction cup 321, is substantially close to the axis of the roller 31. The fixing end 322a of the tubular support sleeve 322, for fixing the suction cup, is capable of coming into abutment, in said retracted position of the sleeve, against the free end 331b of the ring 33. In other words, in the retracted position of the tubular support sleeve 322, most of said sleeve is received in the main chamber 312 inside the roller 31, in particular the portion where the opening 322c is arranged. The suction cup 321 is thus placed under a depression by means of the opening 322c which brings the suction cup 321 into communication with the inner chamber 312 of the roller. In the retracted position of the tubular support sleeve 32 shown in FIG. 2, the suction cup 321 is brought close to the outer face of the wall 311 of the roller 31.

Furthermore, the suction cup gripping tool 32 is shown in FIG. 2, in the removal position. Said removal position is defined when the rotation of the roller 31 with respect to the conveyor belt brings the suction cup gripping tool 32 so as to be substantially perpendicular to the plane defined by the conveyor belt 2, in other words into a position relative to the conveyor belt 2 where the suction cup 321 is oriented so as to be substantially opposite the underlying conveyor belt 2.

Thus, when the suction cup gripping tools 32 borne by the roller 31 arrive in the removal position, on account of the rotation of the roller, the corresponding tubular support sleeves 322 are in the position retracted into the roller on account of the depression prevailing in the roller, and all the suction cups are placed under a depression by the opening 322c, ensuring the communication with the main chamber 312 under depression. Furthermore, on account of the retracted position of the tubular support sleeves, the suction cups brought into the removal position relative to the conveyor belt 2, by the rotation of the roller, are in the near position relative to the outer face of the wall 311 of the roller 3. Said near position of the suction cups 321 is defined such that the suction cups 321, when they are brought into the removal position by the rotation of the roller 31, are not in contact with the eggs moving below, on the conveyor belt.

It is thus intended to selectively command the process of contacting with the eggs for only the suction cups which have to remove an egg that has been identified as non-compliant, in order to allow for the removal of said egg by suction and the extraction thereof from the belt, while the other suction cups, which are also brought into the removal position but which do not have to grasp an egg, are not commanded to come into contact with the eggs and are kept in the position thereof close to the wall of the roller 31, at a distance from the eggs.

This mode of operation is particularly advantageous insofar as it makes it possible to avoid systematic contact with the eggs by all the suction cups brought into the removal position, such contacts being liable to cause health risks.

The commanding of this selective contact of the suction cups, in the removal position, with an egg moving on the roller that is identified as being non-compliant is based on the use of an actuator 34 which makes it possible to selectively command, in the removal position, the movement of the tubular support sleeve 322 from the retracted position thereof (FIG. 2) towards a deployed position, in the direction of the conveyor belt 2 (FIG. 3), such that the corresponding suction cup 321, in a position remote from the outer face of the wall of the roller, comes into engagement with the egg that is identified as non-compliant and has to be removed. This mode of operation furthermore has the advantage of being able to effectively ensure the extraction of the eggs, insofar as the suction cup 321 is forced to move by the command applied to the tubular support sleeve thereof, until it comes into contact with the egg, thus ensuring the good engagement thereon by suction, including when the moving eggs may be of varying sizes.

The actuator 34 comprises a cylinder 340 which is part of a set of cylinders mounted in a fixed manner with respect to the roller and aligned inside the roller, so as to be able to each selectively command the movement of a respective tubular support sleeve of a row of suction cups of the roller, when this is brought into the removal position by the rotation of the roller.

Figure 3:
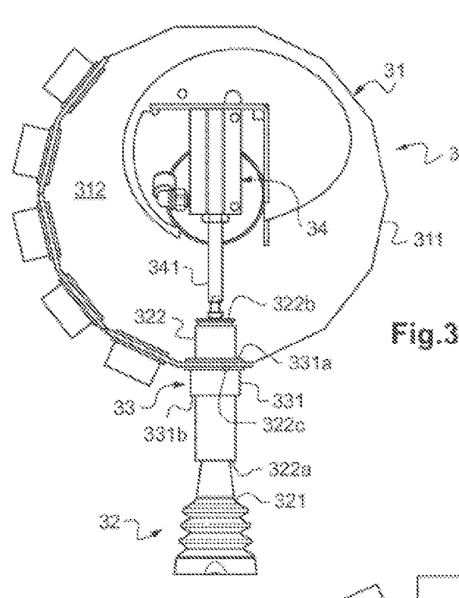
FIG. 3 is a cross section similar to that of FIG. 2, in which the sleeve of the tubular support sleeve associated with the suction cup to be controlled is shown here in the deployed position, under the effect of the actuator integrated in the roller.

The cylinder 340 is arranged such that, when it is actuated to command the movement of the corresponding suction cup into the removal position for the contacting thereof with an egg identified as non-compliant, the rod 341 of the cylinder comes into contact against the closed end 322b of the hollow tube forming the tubular support sleeve of the sleeve, and pushes said sleeve in the direction of the conveyor belt. The tubular support sleeve thus assumes a deployed position, as shown in FIG. 3.

In this deployed position, the tubular support sleeve 322 is moved towards the conveyor belt under the action of the cylinder rod 341 pushing the end of the sleeve 322b, which substantially approaches the inner face of the wall 311 of the roller 31. As a result, the fixing end for the suction cup 321, which was in abutment against the free end 331b of the guide ring 33 in the retracted position of the sleeve, moves radially away therefrom as the sleeve moves under the action of the cylinder, and consequently the suction cup 321 mounted on the fixing end 322a of the sleeve is brought into a position remote from the outer face of the wall 311 of the roller, until it comes into contact with the egg, which can be removed by suction, by the suction cup, still kept under depression.

It is essential for the suction cup to be kept under depression during the entire course of the movement thereof in the direction of the conveyor belt, in order to allow for engagement with the egg by suction.

The suction cup 321 is placed under a depression by means of the opening 322c which makes it possible to bring the suction cup 321 into communication with the inner chamber 312 of the roller. In the retracted position of the tubular support sleeve 32 shown in FIG. 2, it can be seen that the opening 322c is arranged in the main chamber 312, under depression, arranged inside the roller 31. It is thus expedient to retain the communication between the suction cup and the main chamber, via the opening 322c, over the entire length of the movement course of the sleeve, from the retracted position thereof into the deployed position thereof. This is made possible by virtue of the particular configuration of the shank 331 of the guide ring passing through the wall 33, in which the tubular support sleeve of the suction cup is mounted.

With reference to FIG. 7, the inner surface of the shank 331 comprises two cylindrical support protrusions, 3311 and 3312, respectively, which are arranged at the respective ends of the shank 331a and 331b which are intended to cooperate in a sliding manner with the outer surface of the sleeve 322 mounted in the ring. Said two cylindrical support protrusions at the respective ends of the shank are interconnected by a set-back inner cylindrical surface 3313 defining, together with the outer surface of the sleeve, a secondary chamber that is intended to be connected to the main chamber arranged inside the roller.

In order to achieve this, as shown in the plan view of FIG. 7, the cylindrical support protrusion 3311, arranged on the side of the fixing end 331a of the shank 331, is provided with a plurality of longitudinal grooves 3314, making it possible to bring the second chamber, arranged along the shank of the guide ring, into communication with the main chamber 312 arranged inside the roper 31.

Thus, when the cylinder 34 is actuated so as to push the tubular support sleeve 322 through the guide ring 33, the opening for putting the suction cup 322c under depression, provided on the sleeve, is arranged in the secondary chamber arranged in the guide ring 33, which is placed under depression by virtue of the longitudinal grooves 3314 which connect it to the main chamber 312 arranged in the roller. The opening 322c for placing the suction cup 321, provided on the tubular support sleeve 322, under a depression is thus always in communication with the main chamber 312, under depression, of the roller, during the entire course of movement of the sleeve through the guide ring 33, by way of the secondary chamber, which allows for the depression to be transferred towards the suction cup. The suction cup is thus kept under depression throughout the entire course of the movement of the sleeve, until the suction cup 312 is brought into contact with the egg (not shown).

The guide ring 33 thus advantageously makes it possible to increase the useful movement course of the sleeve, i.e. the movement course of the sleeve where the suction cup is kept under depression, making it possible to "expand" the main chamber, under depression, arranged inside the roller, into the secondary chamber arranged inside the ring.

FIG. 7 also shows the flange 3310 which protrudes radially in the region of the fixing end 331a of the shank 331 of the guide ring 33, for the purpose of the fixing thereof in the region of the hole 313 of the wall 311 of the roller 31.

Then, since the egg to be removed is held in the suction cup 321 by means of suction, the cylinder 34 is controlled so as to retract the cylinder rod 341 such that the tubular support sleeve 322 then returns naturally into the retracted position thereof, as shown in FIG. 2, on account of the depression prevailing in the roller.

Figure 4:
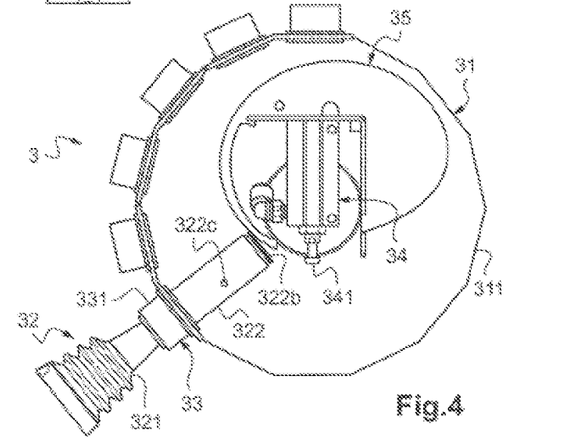
FIG. 4 is a cross section of the transfer device shown above, in a subsequent angular position of the roller, in which the tubular support sleeve associated with the suction cup comes into contact with the means forming the cam that is integrated in the roller.

The suction cup 321, to which an egg (not shown) is rigidly connected under the action of the suction, under depression, of the suction cup, thus continues to rotate, as can be seen in FIG. 4. Substantially at the end of an eighth of a rotation from the removal position, the tubular support sleeve 322 of the suction cup and, more precisely, the end 322b thereof, is moved so as to be opposite a means forming a cam 35 which extends inside the roller 31 between the inner face of the lateral wall 311 thereof and the axis of rotation thereof.

The cam 35 is mounted in a fixed manner with respect to the roller 31, for example by means of fixing to one of the end walls 13. The function of the cam 35 is that of forcing the movement of the tubular support sleeve 322 of the suction cup 321 towards the outside, during the rotation of the roller, after the suction cup reaching the removal position, until the opening 322c for putting the suction cup 321 under depression is placed in the open air, at least in part, when the suction cup 321 is brought, by the rotation of the roller, into a given angular position corresponding to the release position, for example offset by approximately a three-quarter turn after the removal position reached by the suction cup. In this position, since the opening 322c of the sleeve has been placed in the open air, the suction cup 321 is no longer under depression, which makes it possible to release the egg from the suction cup.

Figures 5, 6:
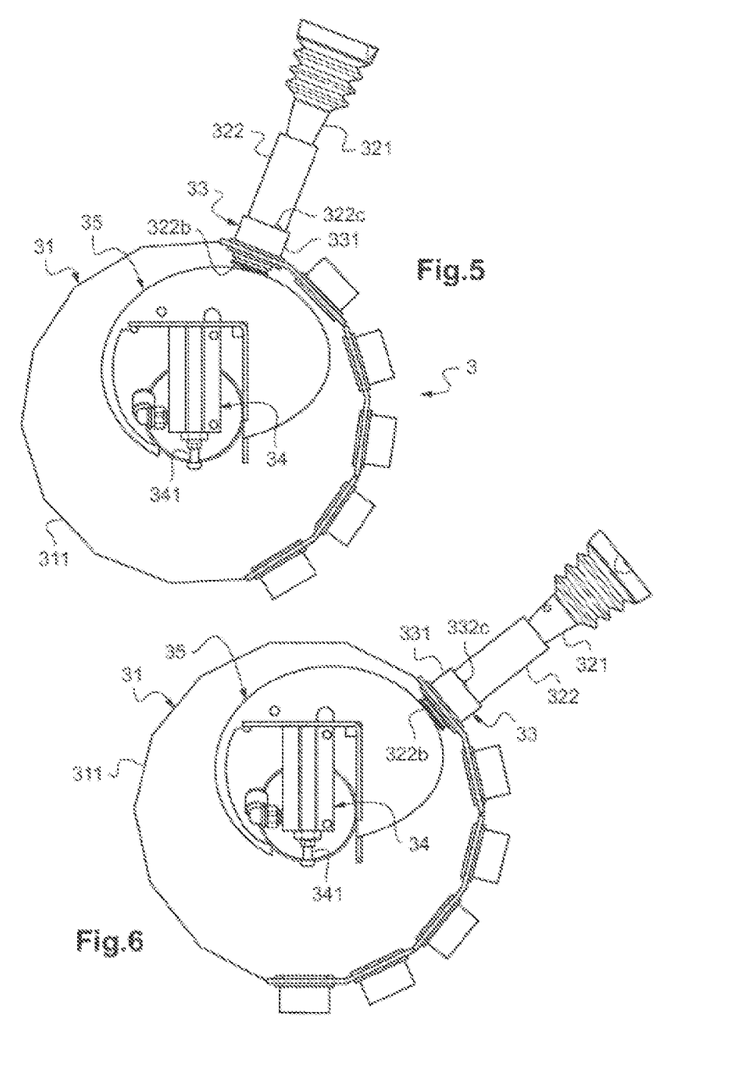
FIGS. 5 and 6 are cross sections of the transfer device illustrated above, showing the roller reaching an angular position that corresponds to the release position for the suction cup shown.

As shown in FIGS. 4 to 6, the end 322b of the tubular support sleeve 322 comes into contact with the first end of the ramp formed on the cam 35, the profile of which converges towards the inner face of the wall 311 of the roller 31, as far as the release position. Under the effect of the contact between the cam 35 and the end 322b of the tubular support sleeve 322 which is mounted so as to be movable in translation through the guide ring 33, the rotation of the roller 31 brings about the movement of the sleeve towards the outside, through the guide ring 33, as far as a position of the sleeve referred to as over-deployed, which position is reached when the suction cup 321 is brought into the release position. In this position, referred to as over-deployed and visible in FIG. 6, the sleeve 322 is forced into deployment under the effect of the contact with the cam 35 during the rotation of the roller, such that the opening 322c thereof leads onto the outside of the guide ring 33, opposite which, with respect to the wall 311 of the roller 31, it is thus placed in the open air. This arrangement of the opening 322c of the tubular support sleeve 322 of the suction cup brings about the end of the suction of the egg by the suction cup.

The over-deployed position of the sleeve 322 is referred to in contrast with the deployed position. In the first position, the suction cup 321 is no longer under depression, while it is still kept under depression in the second. Indeed, the deployed position of the sleeve 322 corresponds to a position of the sleeve 322 deployed towards the outside of the roller 31 under the effect of the actuator 34, where the suction cup 321 is remote from the wall 311 of the roller 31 in order to be brought into contact with the egg to be removed, and where the opening 322c for placing the suction cup 321 under depression, which opening is provided on the sleeve 322, is still maintained in the inside of the secondary chamber, under depression, arranged in the guide ring 33, in order to keep the suction cup 321 under depression. In contrast, the over-deployed position of the sleeve corresponds to a position of the sleeve 322 deployed towards the outside of the roller under the effect of the cam 35, the profile of which makes it possible to force the deployment of the sleeve 35 towards the outside until the release position of the suction cup is reached, where the opening 322c for placing the suction cup 321 under depression leads into the open air at the output of the guide ring 322.

Thus, in the over-deployed position of the sleeve 322, reached when the suction cup is brought into the release position by the rotation of the roller, the suction cup 321 is no longer under depression. As shown in FIG. 6, it is advantageously possible for the release position of the suction cup 321 to correspond to a rotation of the roller of at least 180° with respect to the removal position, where the suction cup 321 is positioned substantially vertically below the roller, such that the egg can be released from the suction cup simply by means of gravity. The egg is for example released into a receiving tray for eggs identified as non-compliant, for example arranged on a receiving belt, moving perpendicularly to the conveyor belt 2, above said conveyor belt, and positioned relative to the roller such that the eggs released by the effect of the gravity of the suction cups brought into the release position by the rotation of the roller drop into the receiving tray.

Then, the roller 31 continues its rotation cycle, during which the suction cup 321 is brought into the removal position. After the release position, the cam 35 has a profile that is set back towards the inside of the roller capable of allowing for the progressive retraction of the tubular support sleeve 322 towards the inside of the roller during the rotation thereof under the effect of the depression prevailing in the roller, until the sleeve returns to the retracted position shown in FIG. 1. During said retraction of the tubular support sleeve, the opening 322c for placing the sleeve under depression is brought back in communication with the main chamber 312, under depression, of the roller, which allows for said depression to be transferred to the suction cup 321, which is thus ready to be commanded into a removal position again, during a following rotation cycle of the roller.

What is claimed is:

1. A unit for sorting moving parts on a conveyor belt (2), comprising a parts transfer device (3) that is capable of extracting from said conveyor belt parts selectively identified as non-compliant, the parts transfer device comprising a roller (31) that is capable of being mounted so as to be transversely rotatable above said conveyor belt, and a plurality of gripping tools (32) which extend radially at the periphery of said roller and are capable of each selectively removing one part from said conveyor belt when they are brought into a removal position defined by a first angular position of said roller, and of releasing said removed part when they are brought into a release position defined by a second angular position of said roller, each gripping tool (32) comprising a suction cup (321) that is fixed on a tubular support sleeve (322) which is mounted on said roller (31) and leads into the inside of said roller (31), said tubular support sleeve (322) defining an inner duct that is provided with a lateral opening (322c) capable of establishing communication between said suction cup and a main chamber (312) arranged inside said roller that is kept under depression with respect to the ambient air, characterized in that all the suction cups (321) brought into the removal position are placed under depression, each tubular support sleeve (322) being mounted so as to be movable in translation according to the axis thereof through a wall (311) of said roller, an actuator (34) being capable of selectively commanding, in said removal position, the movement of said tubular support sleeve (322) in the direction of said conveyor belt, such that said suction cup (321) comes into engagement with said part to be removed.

2. The unit according to claim 1, characterized in that said tubular support sleeve (322) is formed of a hollow tube element extending on either side of the wall (311) of said roller (31), via a guide ring passing through the wall (33), comprising a shank protruding (331) from an outer face of said wall (311) which is mounted by a first end (331a) in a hole (313) of said wall, said hollow tube element being connected by a sliding connection to said guide ring (33) which allows for a relative translational movement between said hollow tube element and said guide ring.

3. The unit Unit according to claim 2, characterized in that the inner surface of said shank (331) comprises two cylindrical support protrusions (3311, 3312) for supporting an outer surface of said hollow tube element (322), said protrusions being arranged at the respective ends of said shank (331) and interconnected by a set back inner cylindrical surface (3313) which defines a secondary chamber, said cylindrical support protrusion (3311) arranged on the side of said first end (331a) of said shank being provided with a plurality of longitudinal grooves (3314) which are intended to bring said secondary chamber into communication with said main chamber (312) of the roller.

4. The unit according to claim 3, characterized in that said hollow tube element (322) is movable between a position retracted inside the roller (31), under the effect of the depression prevailing in the main chamber (312) arranged inside the roller (31), in which position said opening (322c) is in direct communication with said main chamber in order to transfer the depression to said suction cup (321), and a position deployed towards the conveyor belt (2) under the action of said actuator (34), in which position said opening (322c) is in direct communication with said secondary chamber in order to transfer the depression to said suction cup (321).

5. The unit according to claim 2, characterized in that said shank (331) comprises, at the first end (331a) thereof, a flange (3310) by means of which it can bear on a peripheral edge of said hole (313), by way of a sealing joint.

6. The unit according to claim 1, characterized in that said actuator (34) comprises a cylinder that is mounted inside said roller, which cylinder is capable of pushing said tubular support sleeve (322) through said wall of said roller towards the outside of said roller.

7. The unit according to claim 1, characterized in that it comprises a means that forms a cam (35) and is arranged inside said roller and is fixed with respect to the rotation of said roller, said cam (35) being profiled such that, during the rotation of said roller after reaching said removal position, said tubular support sleeve (322) is capable of encountering the cam (35) and following the cam trajectory so as to force the movement of said tubular support sleeve (322) towards the outside of said roller until said opening (322c) is positioned in the open air, at least in part, in the release position of the gripping tool (32).

8. The unit according to claim 1, characterized in that the first and second angular positions are offset with respect to one another by at least 180°.

9. The unit according to claim 1, characterized in that it comprises a control module (15) which is capable of providing rotational speed instructions of said roller so as to bring about the rotation of the suction cups (321) in a manner having a speed and phase synchronized to the movement of the parts.

10. The unit according to claim 1, characterized in that it is suitable for the processing of poultry eggs, said transfer device (3) being arranged downstream of a candling station intended for detecting the non-compliant eggs with a view to extracting them from said conveyor belt (2) by means of said transfer device (3).

* * * * *